March 7, 1961 L. A. RUSSELL 2,974,310
MAGNETIC CORE CIRCUIT
Filed March 5, 1957

INVENTOR.
LOUIS A. RUSSELL
BY
John E. Dougherty Jr.
ATTORNEY 2,974,310
Patented Mar. 7, 1961

2,974,310

MAGNETIC CORE CIRCUIT

Louis A. Russell, Poughkeepsie, N.Y., assignor to International Business Machines Corporation, New York, N.Y., a corporation of New York Filed Mar. 5, 1957, Ser. No. 644,118

3 Claims. (Cl. 340—174)

The present invention relates to magnetic core logical and transfer circuits which do not require diodes and more particularly to circuits of this type operable in accordance with the Inclusive OR logical function.

The principles of diodeless magnetic core transfer circuits are shown and described in the copending applications having Serial Numbers 528,594; 548,581; 598,651 and 629,631; which applications were filed in behalf of the inventor of the subject invention and assigned to the assignee of this application. A prime advantage, realized with magnetic core transfer and logical circuitry of this type, is that by eliminating diodes the power requirements are greatly reduced and, thus, cores of ferrite material having windings with relatively few turns may be employed.

A prime object of this invention is to provide novel magnetic logical and transfer circuitry utilizing magnetic cores which are small in size, reliable in operation, and economical to produce.

Another object of the present invention is to provide a diodeless magnetic core Inclusive OR circuit.

A further object is to provide a circuit of this type requiring a minimum of magnetic core switching elements.

These and other objects are realized, as is shown in the preferred embodiment herein disclosed, by constructing an Inclusive OR circuit wherein a separate input core is provided for each of the individual signal inputs to the circuit. Each of the input cores is provided with an output winding and these output windings are connected in a series circuit which also includes a winding on a storage core. When any one of the input cores receives an input signal effective to produce a flux reversal therein, the resulting voltage induced on the output winding on that core causes current flow in the above-mentioned series circuit. This current flow is effective to switch the storage core to a state indicative of the fact that an input was applied to the circuit. The operation is the same when two or more of the input cores receive input signals coincidently. However, in the latter case, because of the series connection between the output windings and the winding on the storage core, the total flux change in all of the input cores is substantially the same as when only one input is applied. Therefore, resetting of the input cores involves substantially the same amount of flux change regardless of how many inputs are applied to the circuit. The series circuit is effective to accomplish this result since the impedance presented by this circuit to any output winding linking an input core undergoing a flux reversal is dependent upon whether or not the cores linked by the other windings in the series circuit are then undergoing a flux change. The utilization of this novel arrangement makes it possible to connect the output windings for all of the input cores, which have their input windings coupled directly to the input signal sources for the logical circuit, directly to the same storage core thereby making it necessary to provide only a single path transfer circuit from the input cores to the output terminals for the logical circuit.

Therefore, another object of the invention is to provide a magnetic core logical circuit having an input core for each individual input to the logical circuit wherein each of the input cores is provided with an output winding and these output windings are connected in series circuit relationship in a closed loop.

Another object is to provide a plural input logical magnetic core circuit of this type wherein only a single path transfer circuit is required to couple the input cores to the point at which the logical circuit output is taken.

Another object is to provide a magnetic circuit wherein the amount of flux reversal accomplished when a signal is applied to one core is controlled by coincidently producing flux changes in a second core having an output winding in series circuit relationship with an output winding on the first core.

Another object is to provide a plural input logical diodeless magnetic core circuit wherein there is required only one input core for each input to the logical circuit and the output windings on all the input cores are connected to a winding on a single storage core.

Other objects of the invention will be pointed out in the following description and claims and illustrated in the accompanying drawings, which disclose, by way of example, the principle of the invention and the best mode, which has been contemplated, of applying the principle.

Figures 1, 2, 3:
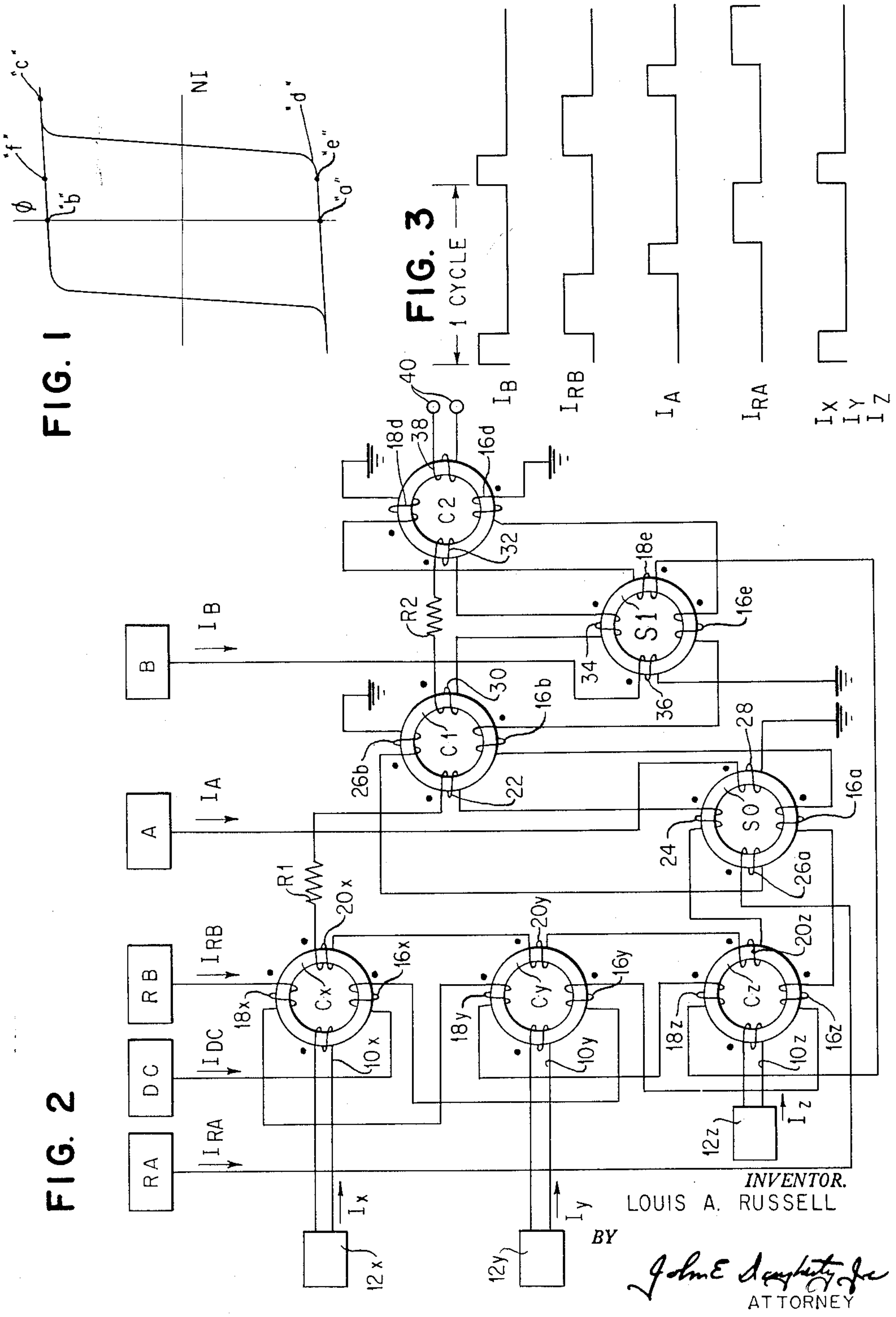
Fig. 1 is a plot of flux versus applied magnetomotive force for a magnetic core such as might be used in the circuits of the present invention.
Fig. 2 is a diagrammatic showing of a logical magnetic core circuit constructed in accordance with the principles of the invention.
Fig. 3 is a pulse timing diagram for the circuit of Fig. 2.

Referring now to Fig. 1, there is shown a plot of flux ($\phi$) versus magnetomotive force (NI) for a core of magnetic material such as may be employed in the circuitry of the present invention. The cores exhibit two stable states of flux remanence in opposite directions and these states are designated *a* and *b*. In the description of the invention to follow flux orientation in the direction of remanent state *a* is designated the binary zero state and in the direction of remanent state *b* the binary one state. The plot is in the form of a hysteresis loop which is essentially rectangular and, therefore, when the core is in one of the remanent states, it is necessary to apply a force in the proper direction and greater than a predetermined minimum or threshold force before switching of the flux is initiated. When a force less than the threshold force is applied, the core, upon termination of the force, reassumes its initial remanent state. Further, the ratio of the flux at remanence in either direction to the flux at saturation in the same direction is relatively high and when, for example, the core is initially in a remanent state at *b* and is subjected to a force effective to increase the flux in the same direction and, therefore, cause the segment *bc* to be traversed, the flux change experience is very small. An appreciable flux change is, of course, experienced when the core is switched from one remanent state to the other. For example, when a magnetomotive force in the proper direction and greater than the threshold force is applied with the core in the remanent state *a*, the loop is traversed along the segment *adc* and upon termination of the applied force, the core assumes the remanent state at *b*. The rate at which the flux is switched during such a flux reversal, and, therefore, the magnitude of the voltage which is induced on an output winding linking the core as a result thereof, is dependent upon the amount by which the applied force exceeds the threshold force for the core. The greater the applied force, the faster will be the rate of flux reversal and therefore the larger will be the output voltage developed.

Referring now to Fig. 2, there is shown a plurality of cores of this type with the windings and pulse generators required to construct one embodiment of an Inclusive OR circuit in accordance with the principles of the invention. The function of an Inclusive OR circuit is to produce an output signal in response to the application of an input signal to any one or more of a plurality of input terminals.

There are three input cores *Cx*, *Cy* and *Cz* in the circuit of Fig. 2 and the inputs to the logical circuit are applied to windings 10*x*, 10*y* and 10*z* on these cores. Each of these input windings is coupled to a corresponding one of three input signal sources 12*x*, 12*y* and 12*z*. Each of these signal sources is effective, when actuated, to cause current flow in the direction indicated by the arrows $I_x$, $I_y$ and $I_z$. Current flow in this direction renders the connected windings 10*x*, 10*y* and 10*z* effective to apply to the linked input cores a magnetomotive force in the binary one representing direction. In order to facilitate the description a dot notation is here employed to indicate the sense of the windings on all of the cores in the circuit. In accordance with this notation, the application of a signal effective to cause current to flow into the undotted terminal of a winding renders that winding effective to apply magnetomotive force in the binary one direction, that is, magnetomotive force in a proper direction to drive the linked core from the binary zero state at *a* of Fig. 1 to the binary one state at *b*. Conversely, when current is forced to flow into the dotted terminal of a winding, magnetomotive force is thereby applied in the opposite or binary zero direction. When a core is caused to undergo a flux change in the binary zero direction, for example, when the core is being driven from *b* to *a*, the voltage induced on an output winding on that core is such that the dotted terminal is positive with respect to the undotted terminal. Conversely, when a core is caused to experience of flux change in the binary one direction, the voltage developed on an output winding on that core is such that the dotted terminal is negative with respect to the undotted terminal. Therefore, as mentioned above, when any one of the signal sources 12 is actuated, current is caused to flow into undotted terminal of the associated input winding 10 and the linked core is subjected to a magnetomotive force in a direction proper to switch the core from the binary zero to the binary one state.

Each of the input cores is also provided with a direct current bias winding 16, a reset winding 18 and an output winding 20. The three output windings 20*x*, 20*y* and 20*z*, on the input cores *Cx*, *Cy*, *Cz*, are coupled in a series circuit which also includes a resistor R1, a winding 22 on a coupling core C1, and a winding 24 on a storage core S0. The cores S0 and C1 are also provided with bias windings 16*a* and 16*b*, respectively, and with reset windings 26*a* and 26*b*, respectively. Core S0 is also provided with a shift drive winding 28 and core C1 with an output winding 30. The output winding 30 on core C1 is connected in a series circuit which includes a resistor R2, a winding 32 on another coupling core C2, and a winding 34 on a second storage core S1. The cores C2 and S1 are provided with bias windings 16*d* and 16*e*, respectively, and reset windings 18*d* and 18*e*, respectively. Core S1 is also provided with a shift drive winding 36 and core C2 with an output winding 38, which is connected to the output terminals 40 for the Inclusive Or Circuit.

The various reset, bias and drive windings on the cores receive their signals from four pulse generators designated RA, RB, A and B and a direct current source DC. The direction of current flow from these sources is as indicated by arrows $I_{RA}$, $I_{RB}$, $I_A$, $I_B$ and $I_{DC}$. There is a bias winding 16 on each of the cores in the circuit and, since the continuously applied bias current supplied by source DC is caused to flow into the undotted terminals of these windings, the biasing magnetomotive force applied to the linked cores is in the binary one direction. However, the magnitude of the current flow $I_{DC}$ and the number of turns in the windings 16 are such that the magnetomotive force applied by each to its associated core is less than the threshold force for the core. Therefore when this bias force is applied to a core in the binary zero state at *a*, the core is merely held at a point *e*, to the left of the knee or threshold of the loop. When the bias current is applied to a core in the binary one representing state at *b*, the effect is that the core is held at a point *f* along the saturation segment *bc*. The effect of this continuously applied bias current is to render a core, with flux oriented in the binary one direction, capable of withstanding a relatively large magnetomotive force in the opposite direction without being switched. It is also true, of course, that with a core in the binary zero condition being at point *e*, switching to the binary one condition may be accomplished with a smaller applied magnetomotive force that would be necessary were the core in the remanent state at *a*.

Each of the clock pulse generators is effective, when actuated, to cause current to flow into the dot marked terminal of each of the windings connected thereto and, thus, when actuated, each generator causes a magnetomotive force in the binary zero direction to be applied to each of the cores with which it is associated. The timing of each of the clock pulse generators is shown in Fig. 3 and the operation of the circuit will now be described with reference to the timing diagram as well as to Figs. 1 to 2.

The first clock pulse is supplied by clock pulse generator B and it is assumed here that the flux in each of the cores in the circuit is initially oriented in the binary zero direction. Due to the continuously applied bias current, each of the cores is thus initially in a flux state represented at *e* in Fig. 2. The pulse supplied by pulse generator B renders winding 36 effective to apply magnetomotive force in the binary zero direction to core S1. Since the flux in this core is initially oriented in this direction, no appreciable flux change is experienced. The input time for the logical circuit coincides with the time during which the $I_B$ pulse is applied and one or more of the signal sources 12 may be then actuated to cause current to flow through corresponding ones of the input windings. Consider that, during this first cycle, signal source 12*x* is actuated causing a current $I_x$ to flow into the undotted terminal of winding 10*x* on input core *Cx*. This core is thus subjected to a magnetomotive force in the binary one direction and the magnitude of the current and number of turns in input winding 10*x* is such that the flux in the core is reversed. As a result of this flux reversal, an output voltage is induced in winding 20*x* which is effective to cause current to flow in a counterclockwise direction in the series circuit including windings 20*y*, 20*z*, 24, 22 and resistor R1. This current flow is in the proper direction to switch both of the cores S0 and C1 to the binary one state. However, at this time with cores S1 and C2 in the binary zero condition, the output winding 30 on core C1 is presented with a relatively low impedance thereby rendering it more difficult to switch core C1 than core S0. Further the number of turns in winding 22 is less than the number of turns in winding 24. As a result of these two factors, the aforesaid counterclockwise current flow in the series circuit coupling these cores to the input cores C is effective to switch only core S0 to the binary one condition and core C1 remains in the binary zero condition. Thus, when, with all of the cores initially in the binary zero condition, pulse generator 12*x* is actuated, cores *Cx* and S0 are switched to the binary one condition.

The next pulse to be applied is the $I_{RB}$ pulse supplied by pulse generator RB. This pulse is applied to windings 18 on cores Cx, Cy, Cz, S1 and C2. All of these cores but input core Cx are in the binary zero condition, and therefore, the $I_{RB}$ pulse is effective to cause an appreciable flux change only in input core Cx, as this core is reset to the binary zero condition. In order to prevent this resetting operation from changing the flux state of storage core S0, the magnitude of the $I_{RB}$ pulse is such that core Cx is switched at a relatively slow rate. In this way, the voltage induced in winding 20x is limited to a value below that which is necessary to energize winding 24 sufficiently to render it effective to apply to core S0 a force in excess of the threshold force for that core. This operation is enhanced by the continuously applied $I_{DC}$ bias current which maintains core S0 with its flux oriented in the binary one direction in a flux condition represented at *f* in Fig. 1, thereby allowing this core to withstand a larger magnetomotive force without switching than would be the case were the core in the remanent state at *b*. Upon termination of the $I_{RB}$ pulse, all of the cores in the circuit, with the exception of core S0, are in the binary zero condition at *e* and core S0 is in the binary one condition at *f*.

The next clock pulse is supplied by pulse generator A which is connected to winding 28 on core S0. This pulse causes current to flow into the dotted end of this winding thereby rendering the winding effective to apply a magnetomotive force in the binary zero direction to core S0. The applied current is sufficient to switch core S0 to the binary zero condition thereby causing an appreciable output voltage to be induced in winding 24. This voltage causes current flow in a counterclockwise direction in the series circuit including the output winding 20 on input cores Cx, Cy and Cz and the winding 22 on core Cz. Since the input cores are already in the binary zero state, this current flow through windings 20 tends only to increase the flux orientation in the zero direction in these cores and, therefore, the windings 20 present low impedance to the voltage generated in winding 24 on core S0. As a result, the current flow in the series circuit is of sufficient magnitude to render winding 22 on core C1 effective to switch this core to the binary one state. This switching causes to be induced in the winding 30 on core C1 a voltage which is of a polarity to cause current flow in a counterclockwise direction in a series circuit including this winding, resistor R2 and windings 32 and 34 which link cores C2 and and S1, respectively. Since this current flow is into the undotted terminals of these windings, cores C2 and S1 are subjected to a force in the binary one direction. However, there are fewer turns in winding 32 than in winding 34 and therefore a larger magnetomotive force is applied to core S1 than to core C2. This larger magnetomotive force applied by winding 34 to core S1 is sufficient to switch this core to the binary one condition whereas the lesser magnetomotive force applied by winding 32 to core C2 is less than the threshold force for that core and the core does not, therefore, experience a flux reversal. Thus, upon termination of the $I_A$ pulse, cores C1 and S1 are in the binary one condition and the remaining cores in the circuit are in the binary zero condition. It should be pointed out that the above described operation is exceedingly critical when the impedance of the circuitry to which output terminals 40 are connected during the time core S1 is being switched is high. Where such is the case it is advisable to provide on core C2 a winding connected to pulse generator A, in which case the $I_A$ pulse through this winding prevents switching of this core when the $I_A$ pulse is applied to winding 26 on core C1.

The next clock pulse is the reset pulse supplied by generator RA. This generator is connected to windings 26*a* and 26*b* which link cores S0 and C1, respectively. The current flow is into the dotted terminal of each of these windings and thereby renders the windings effective to apply magnetomotive force in the binary zero direction to the linked cores. The magnetomotive force applied by windings 26*b* to core C1, which core has its flux oriented in the binary one direction, is effective to reverse the flux and cause this core to assume the binary zero state. This flux reversal causes a voltage to be induced on winding 22 which is of a polarity to cause current flow in a counterclockwise direction in the series circuit including the output windings 20 on input cores Cx, Cy and Cz and the winding 24 on core S0. This current flow renders windings 20 effective to apply magnetomotive force in the binary zero direction to the linked input cores, but, since these cores are already in th binary zero condition, no flux reversal is accomplished. The current flow through winding 24 is in a direction to cause this winding to apply magnetomotive force in the binary one direction to core S0. However, winding 26*a* to which the $I_{RA}$ pulse is also applied now serves as an inhibit winding and prevents core S0 from being switched. The flux reversal in core C1, as it is switched from the binary one to the binary zero state by the $I_{RA}$ current flow in winding 26*b*, also causes a voltage to be induced in winding 30 on this core. This voltage causes current flow in the series circuit including resistor R2 and winding 32 and 34 which link cores C2 and S1, respectively. The current flow is into the dotted terminal of each of these windings and since core C2 is in the binary zero condition, no flux reversal is there accomplished. In order to prevent core S1 from being switched, the switching of core C1 by the $I_A$ pulse is accomplished at a slow rate so that the voltage induced in winding 30 and, thus, the current flow in winding 34 is limited to below that which is required to render the latter winding effective to apply to core S1 a magnetomotive force in excess of its threshold force. This operation is facilitate, as was the case above in resetting input core Cx, by the presence of the bias current $I_{DC}$ in winding 16*e* which links core S1. Therefore, upon the termination of the $I_{RA}$ pulse, which completes one cycle of operation, storage core S1 has its flux oriented in the binary one direction indicative of the fact that an input signal was applied to one of the input cores and the remaining cores in the circuit are in binary zero condition.

The next cycle of operation is initiated by the application of the $I_B$ pulse supplied by clock pulse generator B and at the same time one or more of the input signal sources 12*x*, 12*y*, 12*z* may be actuated to apply inputs to the associated input cores. The only difference between the operation in the second cycle and that in the first cycle described above is that upon initiation of the first cycle all of the cores in the circuit were in the binary zero condition whereas upon initiation of this second cycle storage core S1 is in the binary one condition. The $I_B$ clock pulse is effective to switch this core thereby causing an output voltage to be induced in winding 34. This voltage causes current flow in a counterclockwise direction in the series circuit including resistor R2 and windings 30 and 32 on cores C1 and C2, respectively. The current flow into the undotted terminal of winding 32 renders this winding effective to switch core C2 to the binary one condition thereby producing an output pulse on winding 38 which is manifested between the output terminals 40 for the circuit. Since core C1 is initially in the binary zero condition, the current flow into the dotted terminal of winding 30 merely maintains the flux orientation of this core. This effect is desirable since, as was described above, when an input signal is applied at this time to switch one of the input cores Cx, Cy, Cz, the output voltage developed on the associated winding 20 causes current flow through windings 22 and 24 on cores C1 and S0, respectively. Since, at this time, only core S0 is to be switched, the current flow in winding 30 produced as the result of the $I_B$ pulse switching core S1 is in the proper direction to maintain core C1 in the binary zero condition in the presence of the magnetomotive force in the binary one direction then being applied by winding 22.

The operation during this second cycle is thereafter the same with the exception that, since core C2 is driven into the binary one state when core S1 is switched by the $I_B$ pulse, the former core is reset along with any of input cores which was driven to the binary one state, by the $I_{RB}$ pulse supplied by clock pulse generator RB. The resetting of this core C2 does not effect the other cores S1 and C1 having windings coupled in the series circuit with winding 32 because of the rate at which the resetting is accomplished.

It should be noted that the output pulse produced at terminals 40 as the result of the application of an input during the first cycle is exactly one cycle delayed, that is, it is developed during input pulse time for the second cycle. When any one or more of these input signal sources 12 is actuated to energize the associated input winding 10, coincidentally with the application of an $I_B$ pulse by pulse generator B, an output is produced indicative of the entry at the same time in the next cycle. An output might also be taken from an output winding on core S1 in which case the output is realized with a one half cycle delay.

The primary difference between the operation when an input is applied to only one of the input cores C*x*, C*y*, C*z* and when inputs are coincidently applied to two or three of these cores is that the input cores are switched different amounts.

The amount of switching accomplished in any one of the input cores when inputs the coincidently applied to switch either one or both of the other input cores is limited by two factors, the first of which results from the fact that, in the time interval during which storage core S0 is being switched, the impedance, in the series circuit through which a voltage induced on any of the output windings 20 is driving current is dependent upon whether or not the other input cores are then being switched. For example, when only input core C*x* is being switched the output winding 20*y* on core C*y* presents a relatively low impedance to the voltage induced on the output winding 20*x*. However, when input core C*y* is being coincidently switched, its output winding 20*y* in effect becomes a generator which tends to increase the current in the entire series circuit. This additional current flow through the output winding 20*x* tends to further inhibit the switching in that core being produced by the current flow in winding 10*x*. Therefore the impedance of winding 20*y* with respect to the voltage induced in winding 20*x* may, when both cores (C*x*, C*y*) are being switched coincidently, be considered to be a negative impedance which tends to slow down the rate of flux reversal in core C*x*. The same analysis of course holds true as to the impedance presented by winding 20*x* to the voltage induced in winding 20*y* when both cores C*x* and C*y* are being switched coincidently. This effective reduction in impedance presented by the series output circuit to a voltage induced on one of the output windings 20 is, of course, greater when all three input cores are switched coincidently.

The amount of switching accomplished in the input cores is also limited by the fact that the impedance of the closed loop through which the output windings 20 drive current is higher during the time storage core S0 is being switched than after it has been switched. The input currents $I_x$, $I_y$ and $I_z$ are maintained for a time slightly in excess of that necessary, through the voltage induced on the associated output winding 20*x*, to completely switch the storage core S0 when only one input is applied. Thus during practically the entire time an input pulse is applied to one of the windings 10, exclusively, the output winding 20 on the associated core is driving current through the switching impedance of winding 24. However, when two inputs are applied, though the same magnetomotive force is individually applied to each input core, additive voltages are produced on two of the output windings 20 thereby increasing the current flow through winding 24 and thus switching core S0 somewhat more quickly. Once core S0 is switched, the winding 24 presents only a low impedance and the impedance of the series circuit in which the induced voltages on windings 20 becomes principally that of the resistance element R1; it being noted, that regardless of the number of inputs applied, the current in winding 22 never reaches the value necessary to render that winding effective to apply a force in excess of the threshold force for core C1. Since the impedance of the series circuit including the output windings is decreased, the magnetomotive force applied to the input windings 10 is thereafter effective to switch the associated input core at a much slower rate. When three inputs are applied coincidently, core S0 is, of course, switched at a faster rate thereby removing the high switching impedance of winding 24 from the circuit of the output windings 24 at an earlier time.

As a result of these two factors, when three inputs are applied, each of the input cores is switched only about one-third of the way from the binary zero to the binary one condition, and, when two inputs are applied, the two pulsed input cores are switched one-half of the way from the binary zero to the binary one condition. Thus, whether an input is applied to one, two or all three of the input cores, the total flux change produced in the three cores is the same and the current flow in the series output circuit, when these cores are later reset by the $I_{RB}$ pulse, is essentially the same. Resetting of the input cores is accomplished in essentially the same time whether one, two or three inputs are applied, without disturbing the one stored in storage core S0.

Further, it should be noted that when an input is applied to any one of the input cores, the resulting voltage induced on the output winding 20 of the core causes current flow into the dotted terminals of the output windings of the other two input cores. Since these cores are already in the binary zero condition, this current flow causes little or no flux change in the other cores and thus no appreciable pulses are developed on the input windings 10 on the input cores to which no input signal is applied. The three inputs to the Inclusive Or circuit are thus effectively isolated from each other and no deleterious back transfers from one input to the other can occur.

The illustrative embodiment of Fig. 2, shows a preferred form of the Inclusive OR circuit of the present invention. However, though only a three input embodiment is here described in detail, it is, of course, obvious that the same principles might be applied to construct inclusive Or circuits having lesser or greater numbers of inputs. Further though, in the embodiment shown, a DC bias is applied to each of the cores, this biasing arrangement may be eliminated with, however, a corresponding decrease in the operating speeds obtainable. The precisely defined threshold of the cores utilized may, of course, serve alone in the absence of the bias current to prevent unwanted forward and reverse transfers. When the circuit is operated in this way, the rate of resetting the cores with the $I_{RA}$ and $I_{RB}$ pulses must be diminished. Another point to be noted is that, though in the embodiment shown and described all of the cores are of the same construction and exhibit a similar threshold force, it may be advantageous to employ cores having different characteristics. For example, the coupling cores C1 and C2 may be constructed either of a different magnetic material or may be made of the same material but formed with a larger inside diameter than the other cores so that the coupling cores exhibit a higher threshold force. A construction of this nature facilitates the switching of storage cores S0 and S1 without their coupling cores C1 and C2, respectively, being switched.

It is also not necessary that the coupling cores C1 and C2 be constructed of a material having a precisely defined threshold such as is shown in the plot of Fig. 1, though cores having a high degree of magnetic retentivity must be utilized. Where cores of this type are employed, switching of the coupling cores C1 and C2 along with storage cores S0 and S1, respectively, may be inhibited by providing on coupling core C1 a winding which is connected to the B clock pulse generator and providing on coupling core C2 a winding which is connected to the A clock pulse generator.

In the manner shown in Fig. 2, with or without the latter mentioned possible modifications, a plural input magnetic core Inclusive OR circuit may be constructed without the necessity of employing power dissipating diodes. All of the various inputs to the circuit are isolated from each other and the circuit operation is the same regardless of the number of inputs coincidently applied. Further though to achieve the desired isolation of inputs, one input core is employed for each input to the circuit, the output from each of these input cores is directed to a single storage core S0 and the further transfer circuit to the output terminal 40 is accomplished using a single path magnet transfer circuit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An Inclusive OR logical circuit comprising; first, second, third and fourth cores of magnetic material each capable of being caused to assume a first stable state of flux orientation in a first direction and a second stable state of flux orientation in a second direction and each normally in said first stable state; first and second input windings linking said first and second cores, respectively; each of said input windings being effective when input pulses are applied thereto to produce flux reversal in the linked core from said first toward said second stable state; first and second individual input means coupled to said first and second input windings, respectively, for applying logical inputs to said circuit by selectively energizing one only or both of said input windings simultaneously; first and second output windings each associated with a corresponding one of said first and second cores for developing an output voltage when the flux in the associated core is being reversed; third and fourth windings associated with said third and fourth cores, respectively; and means connecting said first and second output windings and said third and fourth windings in a series circuit; the characteristics of said third and fourth cores and the number of turns in said third and fourth windings being such that the current flow through said fourth winding required to switch said fourth core from said first to said second state is greater than the current flow through said third winding required to switch said third core from said first to said second state; whereby the current produced in said series circuit and, thus, in said third and fourth windings in response to voltages developed in said output windings when one or both of said first and second input windings is energized to produce flux reversal in the associated core is effective to cause said third core to be switched but is ineffective to cause said fourth core to be switched from said first to said second state.

2. An Inclusive OR logical circuit comprising; first, second, third and fourth cores of magnetic material each capable of being caused to assume a first stable state of flux orientation in a first direction and a second stable state of flux orientation in a second direction and each normally in said first stable state; first and second input windings linking said first and second cores, respectively; each of said input windings being effective when input pulses are applied thereto to produce flux reversal in the linked core from said first toward said second stable state; first and second individual input means coupled to said first and second input windings, respectively, for applying logical inputs to said circuit by selectively energizing one only or both of said input windings simultaneously; first and second output windings each associated with a corresponding one of said first and second cores for developing an output voltage when the flux in the associated core is being reversed; third and fourth windings associated with said third and fourth cores, respectively; means connecting said first and second output windings and said third and fourth windings in a series circuit; the characteristics of said third and fourth cores and the number of turns in said third and fourth windings being such that the current flow through said fourth winding required to switch said fourth core from said first to said second state is greater than the current flow through said third winding required to switch said third core from said first to said second state; whereby the current produced in said series circuit and, thus, in said third and fourth windings in response to voltages developed in said output windings when one or both of said first and second input windings is energized to produce flux reversal in the associated core is effective to cause said third core to be switched but is ineffective to cause said fourth core to be switched from said first to said second state; first reset winding means on said first and second cores; means for energizing said reset winding means after inputs have been applied to one or both of said first and second cores; said reset winding means on said first and second cores when energized being effective to produce flux reversal in said first and second cores from said second to said first stable state at a rate such that the voltage produced on the output windings on said first and second cores are insufficient to produce enough current in said series circuit to alter the stable state of either of said third and fourth cores; and second reset winding means on said third core; means for energizing said second reset winding means after said first and second cores have been reset; said reset winding means on said third core being effective when energized to reset said third core from said second to said first stable state; the voltage developed on said third winding when said third core is reset being sufficient to produce enough current in said series circuit to render said fourth winding on said fourth core effective to switch said fourth core from said first to said second stable state.

3. An Inclusive OR logical circuit comprising; a plurality of input magnetic cores each capable of attaining first and second stable states of flux remanence in first and second directions, respectively, and each normally in said first state; a plurality of input windings each linking one only of said input cores and each effective when energized with a pulse of predetermined magnitude and direction to produce flux reversal from said first toward said second state in the linked input core; a plurality of output windings, each linking one of said input cores for developing a voltage in response to the flux change produced when a pulse is applied to the input winding linking that core; means for applying inputs to said circuit comprising input means coupled to each of said input windings for selectively applying input pulses simultaneously to one or more of said input windings and thereby produce output voltages on one or more of said output windings; an output core capable of attaining first and second stable states of flux remanence in first and second directions, respectively, and normally in said first state; a further input winding linking said output core; means connecting said plurality of output windings and said further input winding in series in a closed loop; bias winding means continuously energized for each of said plurality of input cores and said output core for applying to said cores a magnetomotive force in said second direction; and each of said output windings being connected in said loop in a first sense and said further input winding being connected in said loop in a second sense such that the current produced in said loop when said voltages are developed in one or more of said output windings in response to said applied input pulses renders said further input winding effective to switch said output core from said first to said second stable state.

References Cited in the file of this patent

UNITED STATES PATENTS

| | | |
|---|---|---|
| 2,691,156 | Saltz et al. | Oct. 5, 1954 |
| 2,695,993 | Haynes | Nov. 30, 1954 |
| 2,696,347 | Lo | Dec. 7, 1954 |
| 2,729,807 | Paivinen | Jan. 3, 1956 |
| 2,734,185 | Warren | Feb. 7, 1956 |
| 2,741,758 | Cray | Apr. 10, 1956 |
| 2,742,632 | Whitely | Apr. 17, 1956 |